No. 680,852. Patented Aug. 20, 1901.
R. F. FOSTER.
VALVE DEVICE.
(Application filed Dec. 27, 1900.)

(No Model.) 2 Sheets—Sheet 1.

Witnesses
J. G. Hinkel
L. Scott Smith

Inventor
Robert F. Foster,
By Foster & Freeman
Attorneys

THE NORRIS PETERS CO., PHOTO-LITHO., WASHINGTON, D. C.

No. 680,852.  
R. F. FOSTER.  
VALVE DEVICE.  
(Application filed Dec. 27, 1900.)  
Patented Aug. 20, 1901.

(No Model.) 2 Sheets—Sheet 2.

UNITED STATES PATENT OFFICE.

ROBERT FREDERICK FOSTER, OF BROOKLYN, NEW YORK, ASSIGNOR TO HAMILTON-FOSTER FOG-SIGNAL COMPANY, OF RIDGEFIELD, CONNECTICUT.

VALVE DEVICE.

SPECIFICATION forming part of Letters Patent No. 680,852, dated August 20, 1901.

Application filed December 27, 1900. Serial No. 41,279. (No model.)

*To all whom it may concern:*

Be it known that I, ROBERT FREDERICK FOSTER, a subject of the Queen of Great Britain, residing at Brooklyn, in the county of Kings and State of New York, have invented certain new and useful Improvements in Valve Devices, of which the following is a specification.

My invention is a device for controlling the flow of fluids; and it consists of a casing and a cylindrical rotatable valve constructed so as to direct the fluid to and receive it from different ports with a minimum of friction and by a very limited movement, as fully set forth hereinafter and as illustrated in the accompanying drawings, in which—

Figure 1:
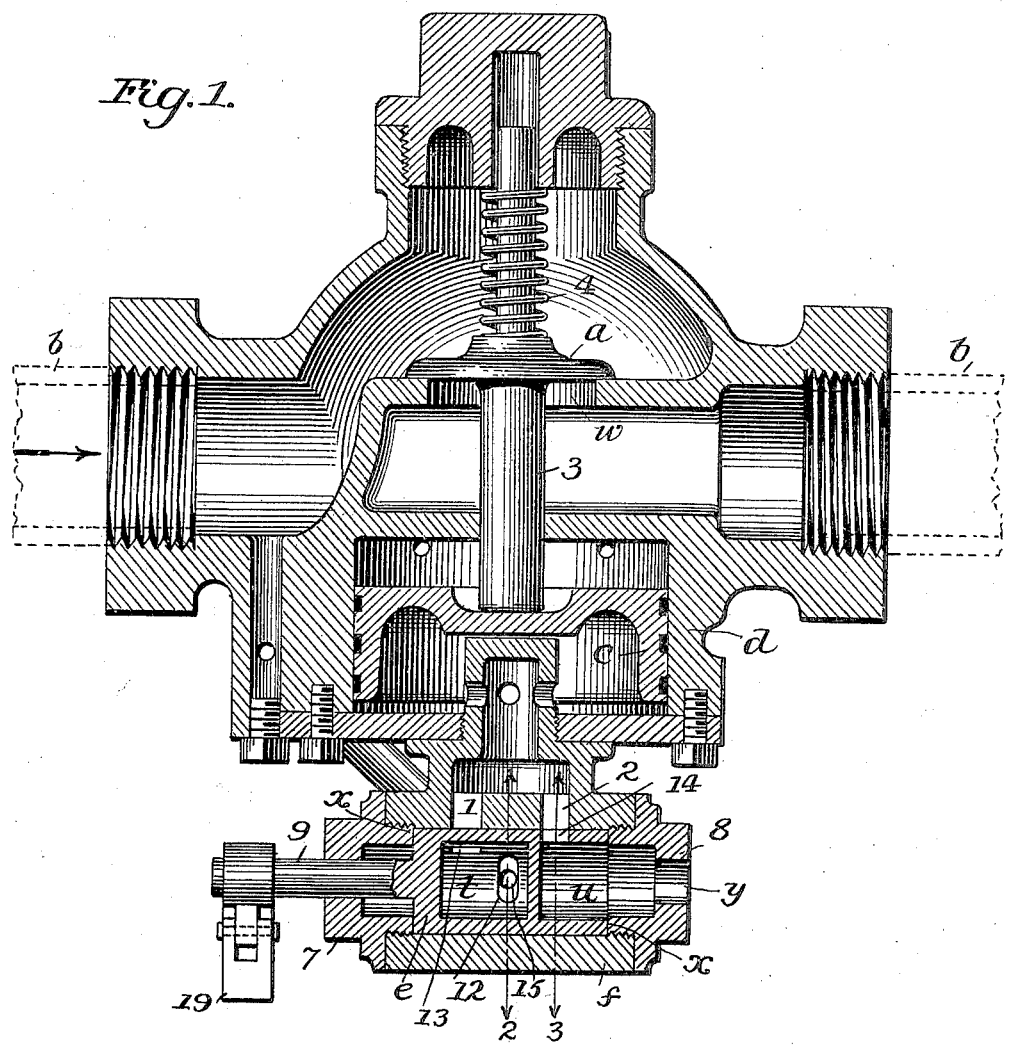
Figure 2:
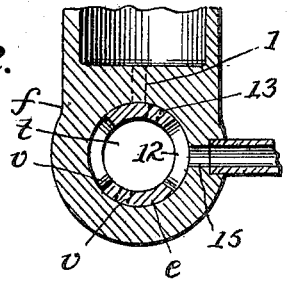
Figure 3:
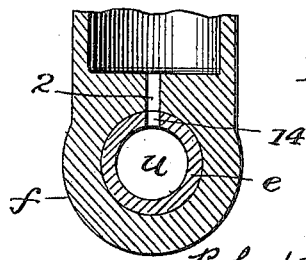
Figure 4:
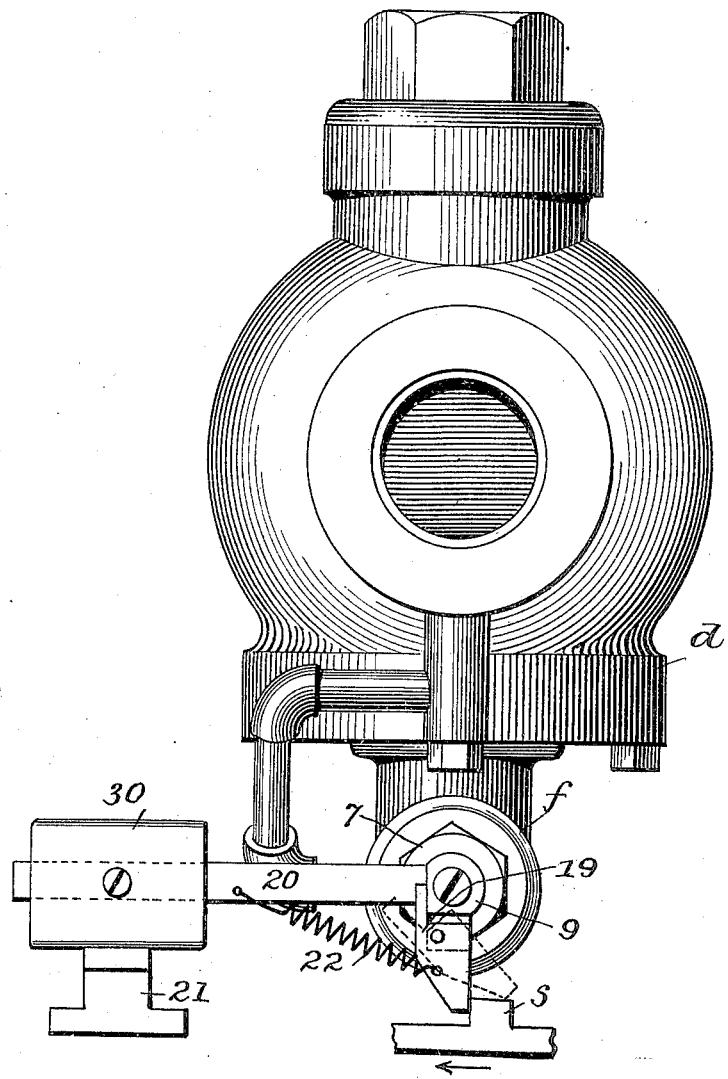

Figure 1 is a sectional elevation of a valve device embodying my invention and showing an application thereof. Fig. 2 is a cross-section on the line 2, Fig. 1; Fig. 3, a cross-section on the line 3, Fig. 1, with the valve in the same position as Fig. 2. Fig. 4 is an exterior view looking in the direction of the arrow, Fig. 1.

The valve device is adapted for use in connection with different appliances, but, as shown, is the means of controlling the flow of fluid to and from the motor of a large control-valve. Thus said control-valve $a$ is shown as controlling the port $w$ in a conduit $b\ b$, through which fluid flows to any suitable apparatus or appliance.

The valve $a$ is shifted in one direction by a motor consisting of a piston $c$ in a casing $d$, having an inlet-port 1 and discharge or exhaust port 2, said piston bearing on or connected to the valve-stem 3, and, if desired, a spring 4 may be arranged to close or aid in closing the valve. These parts are not in themselves new and are shown merely to illustrate an application of my valve device, which serves to direct the fluid to and from the casing $d$. The said device comprises a valve $e$ and its casing $f$ with a valve-stem and arm or lever. The valve $e$ is a true cylinder and is fitted to turn freely but without play in the casing, which has end bearing-faces $x$ for the ends of the valve, which turn on said faces without the intervention of packing. As shown, said faces are at the ends of screw-caps 7 and 8, one perforated for the passage of the stem 9, extending from the adjacent end of the valve, while the other has a port $y$ for the passage of the exhaust fluid. The valve is divided by a cross-partition into two chambers $t\ u$, the exhaust-chamber $u$ being shown as open at the end, although the opening may be at any desired point, but the inlet-chamber $t$ is closed at the ends and has a radial inlet-port 12 and radial outlet-port 13, while the chamber $u$ has a radial port 14. A supply-port 15 in the casing $f$ is arranged to admit steam to the port 12 at all times, and the port 14 is arranged to communicate with the port 2 only when the valve has been turned to cut off communication between the port 1 and port 13. The fluid can thus be admitted to the cylinder $d$ by turning the valve $e$ to one position and is cut off and exhausted therefrom by further turning the valve.

It will be seen that as the chamber $t$ is closed at both ends there is no pressure tending to move the valve longitudinally and that as there are no packings at the ends of the valve there is little frictional resistance to the rocking of the valve. It will further be evident that there is little pressure tending to force the valve laterally against the surface of the bore in the casing $f$; but to prevent this altogether I make ports $v\ v$, &c., opposite the radial ports 12 13 of the chamber $t$, so that any slight tendency to force the valve laterally in one direction will be balanced by the tendency to force it in the opposite direction.

The valve is turned by pressure applied to an arm 19 on the end of the stem 9. This may be fixed, but for some purposes is pivoted, so that it will swing and turn the stem by the movement of a contacting projection $s$ in the direction of the arrow, Fig. 4, but will swing without turning the valve if the projection $s$ is carried beneath the arm in the opposite direction. In some instances also the stem is provided with an arm 20 and counterweight 30, which will turn the valve back to position (limited by a fixed stop 21) after the projection $s$ has rocked the valve in one direction, and a spring 22, connected with the pivoted arm 19 and with the arm 20, serves to maintain the pivoted arm in its normal position. To prevent the pivoted arm from jamming against the top of the projection s if the latter is improperly moved in the direction of the arrow, with the end of the arm improperly resting on the top of the projection, the pivot of said arm is arranged at one side of a vertical plane extending through the axis of the valve. This causes the pivoted arm to swing, as shown in dotted lines, Fig. 4, if it meets the top of the part s, without jamming the latter.

It will be seen that while I have shown my improved valve device as arranged horizontally it will work equally effectively whether horizontal, vertical, or in any other position. It will also be seen that while the ports 13 14 may be separated circumferentially to any desired degree they may be so nearly in line that a very slight movement of the valve will reverse the flow to or from the cylinder.

Without limiting myself to the precise construction and arrangement of parts shown and described, I claim as my invention—

1. The combination of the valve-casing with inlet and outlet ports, a valve and bearings for the ends of the same on the heads of said casing, said valve being hollow and cylindrical, with a transverse partition and two independent chambers, and radial ports communicating with said chambers and arranged to communicate alternately with the inlet and outlet ports of the casing on the rocking of the valve and with a port communicating with the exhaust-port of the casing, substantially as set forth.

2. The combination of the valve-casing with inlet and outlet ports, a valve and bearings for the ends of the same on the heads of said casing, said valve being hollow and cylindrical, with a transverse partition and two independent chambers, radial ports communicating with said chambers and arranged to communicate alternately with the inlet and outlet ports of the casing on the rocking of the valve, and a stem extending centrally from one end of the valve and provided with an operating-arm, substantially as set forth.

3. The combination of the valve-casing with inlet and outlet ports, a valve and bearings for the ends of the same on said casing, said valve being cylindrical with two independent chambers, radial ports communicating with said chambers and arranged to communicate alternately with the inlet and outlet ports of the casing on the rocking of the valve, and a stem extending centrally from one end of the valve and provided with an operating-arm, and with a counterweighted arm, substantially as set forth.

4. The combination of the valve-casing with inlet and outlet ports, a valve and bearings for the ends of the same in said casing, said valve being hollow and cylindrical with a transverse partition and two independent chambers, radial ports communicating with said chambers and arranged to communicate alternately with the inlet and outlet ports of the casing on the rocking of the valve, and a stem extending centrally from one end of the valve and provided with a pivoted operating-arm, substantially as set forth.

5. The valve device consisting of a hollow cylindrical valve, a casing in which said valve turns, inlet and outlet ports in said casing, the said valve having chambers with radial inlet and outlet ports, and a partition between the same, substantially as set forth.

6. The valve device consisting of a hollow cylindrical valve, a casing in which said valve turns, inlet and outlet ports in said casing, the said valve having chambers with radial inlet and outlet ports, and a partition between the same with balance-ports opposite said inlet and outlet ports, substantially as set forth.

7. The combination of a conduit for fluid under pressure, a valve controlling the same, a piston for shifting said valve and piston-cylinder, and a valve for controlling the flow of fluid to and from the cylinder, the same being cylindrical, hollow, closed at one end, and provided with a cross-partition and with radial ports on opposite sides of the partition, the port between the partition and open end being the exhaust-port, substantially as set forth.

8. The combination of the casing $f$, cylindrical valve $e$, spindle extending from one end and arm pivoted to said spindle at one side of a plane extending through the axis of the latter, substantially as set forth.

In testimony whereof I have signed my name to this specification in the presence of two subscribing witnesses.

ROBERT FREDERICK FOSTER.

Witnesses:
HENRY J. GROSS,
CHARLES E. FOSTER.